United States Patent [19]

Bakx

[11] Patent Number: 5,289,440
[45] Date of Patent: Feb. 22, 1994

[54] OPTICAL READING DEVICE AND OPTICAL RECORDING DEVICE

[75] Inventor: Johannes L. Bakx, Eindhoven, Netherlands

[73] Assignee: U.S. Philips Corporation, New York, N.Y.

[21] Appl. No.: 952,028

[22] Filed: Sep. 28, 1992

[30] Foreign Application Priority Data

Dec. 30, 1991 [NL] Netherlands ............... 9102190

[51] Int. Cl.⁵ ............................................. G11B 17/22
[52] U.S. Cl. .................................. 369/32; 369/44.28; 369/58
[58] Field of Search .............. 369/32, 44.28, 44.27, 369/44.29, 44.31, 44.11, 44.34, 44.26, 48, 58.5 A, 54; 360/72.02, 72.01, 77.04, 78.04

[56] References Cited

U.S. PATENT DOCUMENTS 4,413,289 11/1983 Weaver et al. ............. 360/51
4,853,921 8/1989 Takeda ..................... 369/59

FOREIGN PATENT DOCUMENTS 0372650 6/1990 European Pat. Off. .
0429139 5/1991 European Pat. Off. .
9111002 7/1991 Japan .
9111003 7/1991 Japan .

Primary Examiner—Robert J. Pascal
Assistant Examiner—Ali Neyzari
Attorney, Agent, or Firm—Richard A. Weiss

[57] ABSTRACT

An optical reading device for reading information recorded on a track of an optical record carrier, and an optical recording device for recording information on a track of an optical record carrier. Both devices use a radiation source to scan the record carrier (the reading device to read and the recording device to record) and a buffer memory which changes the rate in which the information which is read or to be written enters and leaves the buffer memory. In the reading device, the information read enters the buffer memory at a faster rate than it leave the buffer memory. In the recording device the opposite occurs. As a result, when the buffer memory of the reading device reaches a certain maximum filling level, information read in thereto is interrupted and so is use of the radiation source, such interrupts ending when the filling level of the buffer memory reaches a minimum level. Likewise, when the buffer memory of the recording device reaches a certain filling level, information read out therefrom is interrupted and so is use of the radiation source, such interrupts ending when the filling level of the buffer memory reaches a minimum level.

10 Claims, 5 Drawing Sheets

OPTICAL READING DEVICE AND OPTICAL RECORDING DEVICE

BACKGROUND OF THE INVENTION

The invention relates to an optical reading device for reading information recorded in a track of an optical record carrier, which device comprises a radiation source for generating a radiation beam; an optical system for directing the radiation beam via the track onto a radiation-sensitive detector, the radiation beam producing a scanning spot on the record carrier; a driving device for displacing the scanning spot with respect to the record carrier in a longitudinal direction of the track at a given scanning rate; a signal regaining circuit for regaining recorded information on the basis of a detection signal supplied by the radiation-sensitive detector; a load circuit for loading the regained information in an output buffer memory at a given load rate; a signal retrieval circuit for retrieving the information stored in the buffer memory at a given retrieval rate which is lower than the load rate; control means for interrupting the storage of the regained information in the buffer memory for displacing the scanning spot after a given time interval to the track portion where loading was interrupted and for subsequently resuming the storage of the regained signal at an instant when the scanning spot reaches a track position which corresponds to the position where the loading of the buffer memory was interrupted, such that a filling level of the buffer memory remains between given limits.

The invention also relates to an optical recording device for recording information in a track of an optical record carrier, which device comprises a write unit for providing an information pattern in the track in response to a write signal, for which purpose the write unit comprise a radiation source for generating a radiation beam; an optical system for directing the radiation beam via the track onto a radiation-sensitive detector; the radiation beam producing a scanning spot on the record carrier. The device further comprises a driving device for displacing the scanning spot with respect to the record carrier in a longitudinal direction of the track at a given scanning rate; an input buffer memory for storing information to be recorded at a given load rate; a retrieval circuit for retrieving the information from the input buffer memory at a retrieval rate which is higher than the load rate; a control circuit for converting the retrieved information into the write signal; control means for interrupting the retrieval of the information from the input buffer memory, for displacing the scanning spot after a given time interval to the track portion where the retrieval was interrupted and for subsequently resuming the retrieval of the information, such that a filling level of the input buffer memory remains between given limits.

An optical reading device and an optical recording device of the type described in the opening paragraphs are known, inter alia, from EP-A-0.429.139. It is an object of the invention to provide a reading device of the type described and a recording device of the type described which have a low power consumption.

As regards the reading device, this object is achieved in that the device comprises means for switching off at least the radiation source in time intervals in which the loading of the buffer memory is interrupted.

As regards the recording device, this object is achieved in that the device comprises means for switching off the radiation source in time intervals in which the retrieval of the information is interrupted.

By switching off the radiation source during the time intervals when reading and recording are interrupted, the power consumption of the radiation source is considerably reduced. Since this power consumption constitutes a considerable part of the overall power consumption, the invention yields a considerably economy. For the purpose of illustration, it is to be noted that the power consumption of the radiation source in reading devices is approximately half the overall power consumption. Such power consumption economy is particularly advantageous when the invention is used in battery-fed devices.

Optical reading devices and recording devices are usually provided with a focusing element for focusing the radiation beam. A focal point of the radiation beam is held in, such a plane in which information is recorded. To this end the device is generally provided with a feedback focus control controlling a focus actuator on the basis of a focus error signal in such a way that a position of the focal point fixed by the control signal of a focus actuator is retained in the plane of the information layer. In the most conventional focus controls, a focus error signal is derived from the radiation beam reflected by the information layer. The focus error signal is indicative of the focus error only in a limited measuring range of the focal point. The feedback focus control can, therefore, operate in a reliable manner only when the focal point is located within this measuring range. When the reading operation is started, a capturing procedure is performed in which the focal point is brought within the measuring range. Such a capturing procedure is also performed when the focal point is outside the measuring range. By means of known capturing detection circuits, it can be ascertained whether the focal point is present within the measuring range. There is a risk that the focal point is no longer located within the desired range after the radiation source has been switched on again so that the capturing procedure must be repeated. The drawback of such a capturing procedure is that it is relatively time-consuming.

SUMMARY OF THE INVENTION

Embodiments of a reading device and a recording device in accordance with the invention in which the risk of having to repeat a capturing procedure after the radiation beam is switched on again is considerably reduced, are characterized in that they comprises focusing means for focusing the radiation beam, and a focus control for maintaining a focal point of the focused radiation beam in the plane of the track, the focus control comprising a focus actuator for displacing the focal point in a direction perpendicular to the record carrier, and a control circuit for applying a control signal dependent on a focus error signal to the focus actuator. Such devices also means for maintaining the control signal, during the time intervals when the radiation source is switched off, at a value which is substantially equal to the average value of the control signal in a time interval directly before the radiation source is switched off.

Further embodiments of a reading device and a recording device in accordance with the invention are characterized in that the focus control comprises means for deriving a focus error signal which is indicative of the focus error within a given measuring range of the focal point position; and such devices further comprise focus capturing means for bringing the focal point within the measuring range, the focus capturing means comprising means for reciprocating the focal point between two extreme values, a focus capturing detector for supplying a capturing detection signal indicating that the focal point is within the measuring range, and switching means for switching on the focus control in response to the capturing detection signal. The focus capturing means comprises means for reciprocating the focal point within a range of displacement surrounding a position which corresponds to the retained focus control signal, the range of displacement being smaller than the range fixed by the two extreme values.

These embodiments have the advantage that less time is required for capturing the focus control.

Other embodiments of a recording device and a reading device in accordance with the invention are characterized in that they comprise focusing means for focusing the radiation beam; and a focus control for maintaining a focal point of the focused radiation beam in the plane of the track, the focus control comprising a focus actuator for displacing the focal point in a direction perpendicular to the record carrier, and a control circuit for applying a control signal dependent on a focus error signal to the focus actuator. The focus control comprises means for taking samples of the focus error signal during time intervals when the loading of the buffer is interrupted, and switching means for temporarily switching on the radiation source while the samples are being taken.

In these embodiments, the focal point is retained within the measuring range by means of a sampled control system, thus rendering a capturing procedure superfluous when the radiation source is switched on again.

BRIEF DESCRIPTION OF THE DRAWINGS

Further embodiments will hereinafter be described in detail with reference to FIGS. 1 to 11, in which.

DESCRIPTION OF THE PREFERRED EMBODIMENTS

Figure 1:
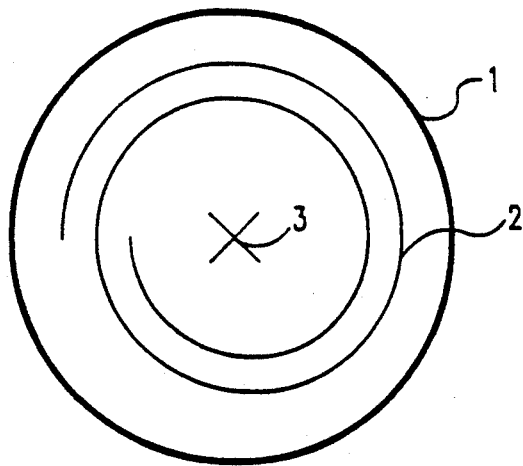
FIG. 1 shows an optical record carrier of a conventional type.

FIG. 1 shows an optical or magneto-optical record carrier of a conventional type, in the form of a disc 1 on which information is recorded in a conventional manner in an information layer in the form of a track 2 of marks which are optically detectable. The track 2 is spiral-shaped and substantially surrounds a point of rotation 3 of the disc concentrically.

Figure 2:
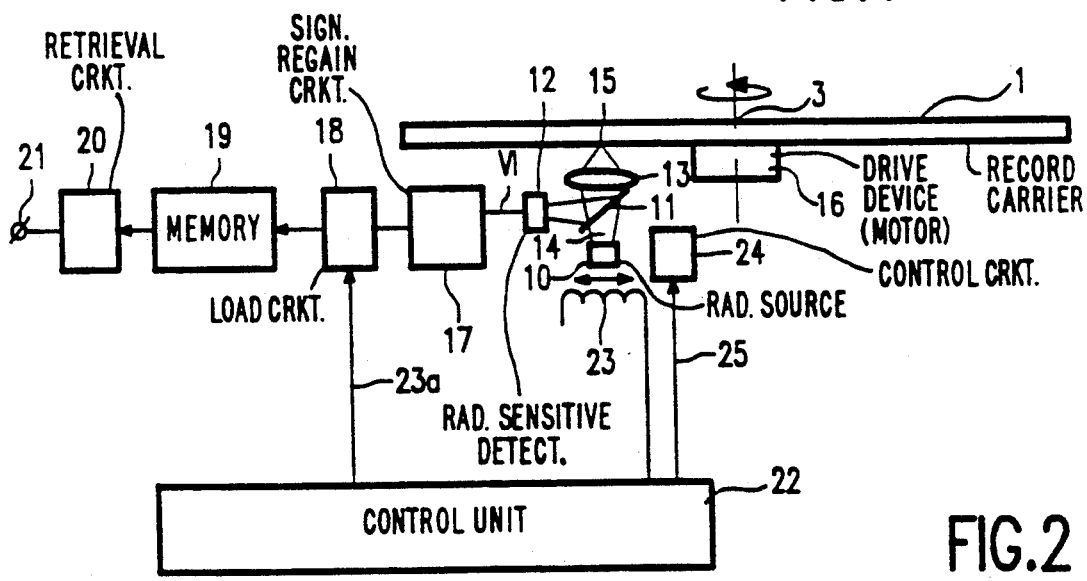
FIGS. 2 and 5 show embodiments of a reading device according to the invention.

FIG. 2 shows a first embodiment of a reading device according to the invention for reading the disc 1. The device comprises a radiation source 10, for example, a semiconductor laser for generating a radiation beam 11. The radiation beam 11 is directed onto a radiation-sensitive detector 12 via the information layer of the disc 1 by means of an optical system. In the embodiment shown in FIG. 2, the optical system comprises a focusing objective 13 and a partially transparent mirror 14 of a conventional type. The radiation beam 11 produces a scanning spot 15 on the information layer of the disc 1. The scanning spot 15 is held on the track by conventional tracking means (not shown). The disc is rotated about its point of rotation 3 by means of a driving device in the form of a motor 16, so that the scanning spot 15 is displaced in the longitudinal direction of the track 2 at a given scanning rate. The radiation beam incident on the detector 12 is modulated in the track in accordance with the scanned marks. Consequently, the detector 12 supplies a read signal VI in conformity with the modulation of the radiation beam to a signal-regaining circuit 17, which regains the information represented by the read signal VI frm the read signal V1. The regained information is applied to a load circuit 18. The load circuit 18 is of a conventional type which stores the received information in an output buffer memory 19 at a load rate corresponding to the bit rate of the regained information. A retrieval circuit 20 retrieves the information stored in the output buffer memory 19 at a retrieval rate which is lower than the load rate. The retrieved information is applied to an output 21 by the retrieval circuit.

As a result of the difference between the load and retrieval rates the filling level of the output buffer memory 19 will increase. To prevent "overflow" of the output buffer memory 19, the reading device of FIG. 2 comprises a control unit 22, which renders the load circuit inoperative via a signal line 23a as soon as the input buffer has reached a given maximum filling level. Since the retrieval of information from the output buffer memory continues, the filling level will decrease again. As soon as the filling level has reached a given minimum value, the scanning spot 15 is displaced to the track portion where the loading operation was interrupted. The scanning spot 15 can be displaced under the control of the control unit by means of an actuator 23 of a radial displacement device of a conventional type. As soon as the desired track portion is reached, the loading of the output buffer memory 19 is resumed. The control of interrupting the loading of the output buffer memory 19, the displacement of the scanning spot 15 and the resumption of the loading operation is described in detail in, inter alia, EP-A-0.429.139, WO 91/11002 and WO 91/11003, which documents are incorporated herein by reference.

Figure 3:
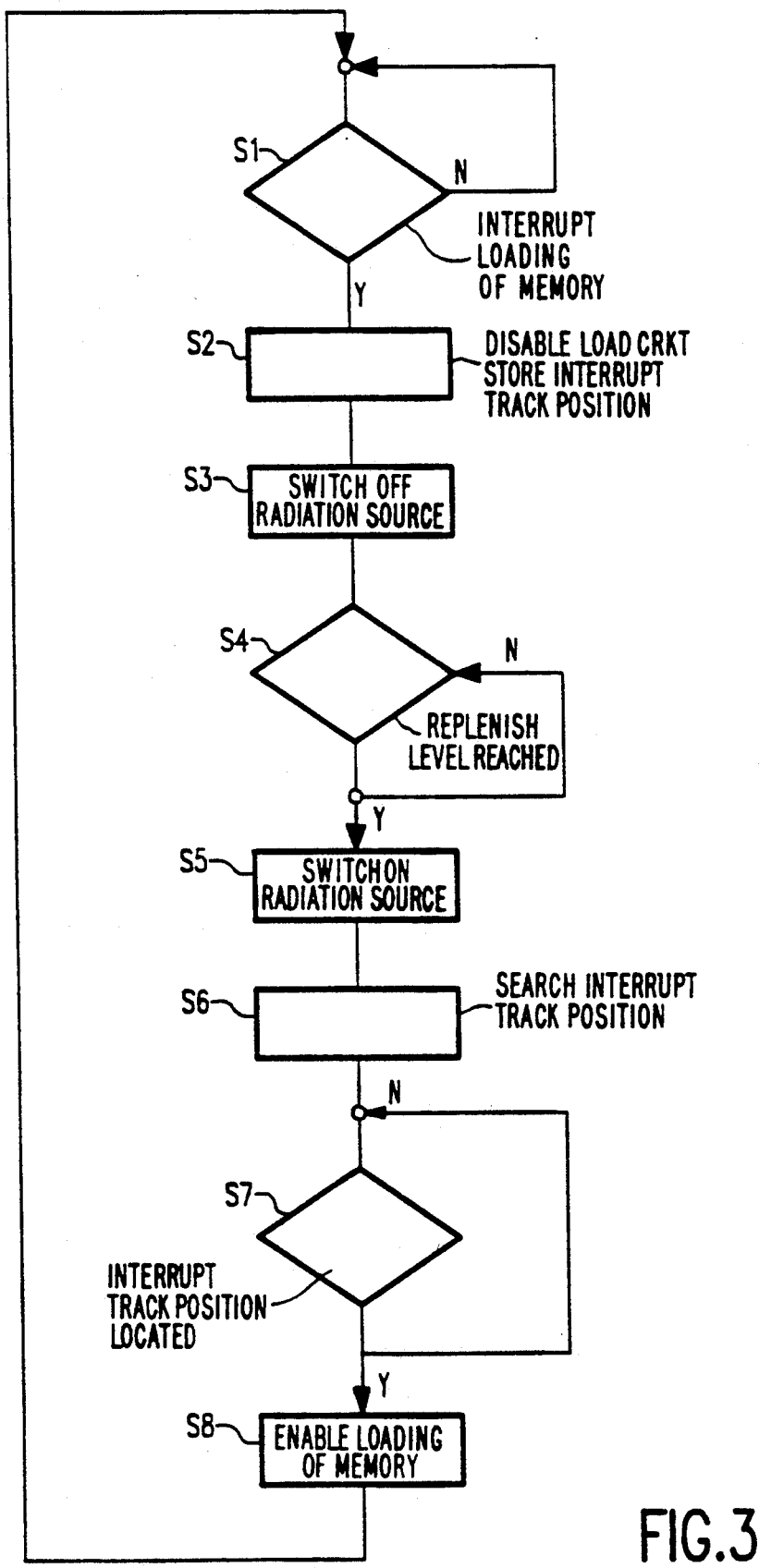
FIG. 3 shows a flow chart of a control program which is performed by a control unit of a recording device according to the invention.

The reading device of FIG. 2 also comprises a control circuit 24 for the radiation source 10. The control circuit 24 is of a conventional type with which the radiation source can be switched on and off in response to a logic control signal. The radiation source 10 is switched on and off under the control of the control unit 22, which is coupled for this purpose to the control circuit 24 via a signal line 25. Switching on and switching off the radiation source 10 by the control unit 22 can be controlled by means of hard-wired circuits or with a program-controlled circuit. FIG. 3 shows by way of example a flow chart of a suitable control program.

The program of FIG. 3 comprises a step S1 in which it is determined, in a known manner, whether the loading of the output buffer memory must be interrupted. As soon as it has been ascertained in step S1 that the loading of the output buffer memory 19 must be interrupted, step S2 is performed. In step S2, the load circuit 18 is rendered inoperative via the signal line 23. Moreover, the position in the track where the loading has been interrupted is determined in this step. Information about this position, in the form of, for example, an address, is stored in a memory of the control unit 22. Subsequently step S3 is carried out. In step S3, the radiation source 10 is switched off via the signal line 25. Subsequently step S4 is carried out. In step S4, the instant when the filling level of the output buffer memory has reached the low filling level wherein it is desired to "replenish" the output buffer memory 19 is determined in known manner. As soon as it has been ascertained that "replenishment" is desired, step S5 is performed. In step S5, the radiation source 10 is switched on again. Subsequently, in step S6, a search instruction to search for the position in the track 2 where the loading was interrupted is given. In step S7, it is checked whether this position has been reached. As soon as it has been ascertained that this position is reached, the loading of the output buffer memory 19 is resumed in step S8. Subsequently the program is continued with the execution of step S1.

The embodiment described hereinbefore has the advantage that the radiation source 10 is switched on only during a limited period, which results in a considerable reduction of the power consumption of the reading device. In fact, the power consumption of the radiation source 10 is approximately half the overall power consumption of the device. The reduction of the power consumption is particularly advantageous in battery-fed devices such as, for example, portable devices.

In the embodiments described hereinbefore, only the radiation source 10 is switched off in the time intervals when loading of the output buffer memory 19 is interrupted. It will be evident to those skilled in the art that in these time intervals, the detector 10, the signal-regaining circuit 17 and the load circuit 18 may also be switched off. This yields an extra contribution to the reduction of the electric power consumption.

Optical reading devices usually comprise a focusing element, i.e., objective 13 in FIG. 1, for focusing the radiation beam. A focal point of the radiation beam is held in the plane of the information layer. To this end, such a device is generally provided with a feedback focus control which controls a focus actuator on the basis of a focus error signal in such a way that a position of the focal point fixed by the control signal of the focus actuator is held in the plane of the information layer. In most conventional focus controls, a focus error signal is derived from the radiation beam reflected by the information layer. For a focus control in which a focus error signal is derived in the manner described hereinbefore, reference is made to, for example, European Patent Application EP-A-0.372.650, which is incorporated herein by reference.

Figure 4:
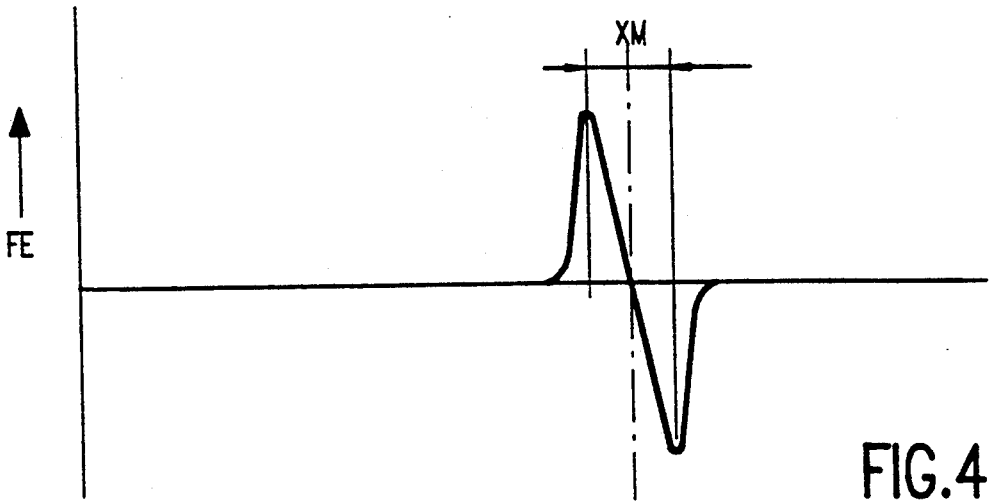
FIG. 4 shows a conventional focus error signal as a function of the position of a focal point.

FIG. 4 shows the variation of a focus error signal FE as a function of a distance x between a focal point and an information layer. The focus error signal FE is indicative of the focus error only within a limited measuring range XM of the focal point. The feedback focus control can, thus, operate reliably only when the focal point is located within the measuring range XM. When the reading operation is started, a capturing procedure is performed in which the focal point is brought within the measuring range XM. Such a capturing procedure is also performed when the focal point is outside the measuring range XM. By means of known capturing detection circuits, it can be ascertained whether the focal point is within the measuring range.

Figure 11:
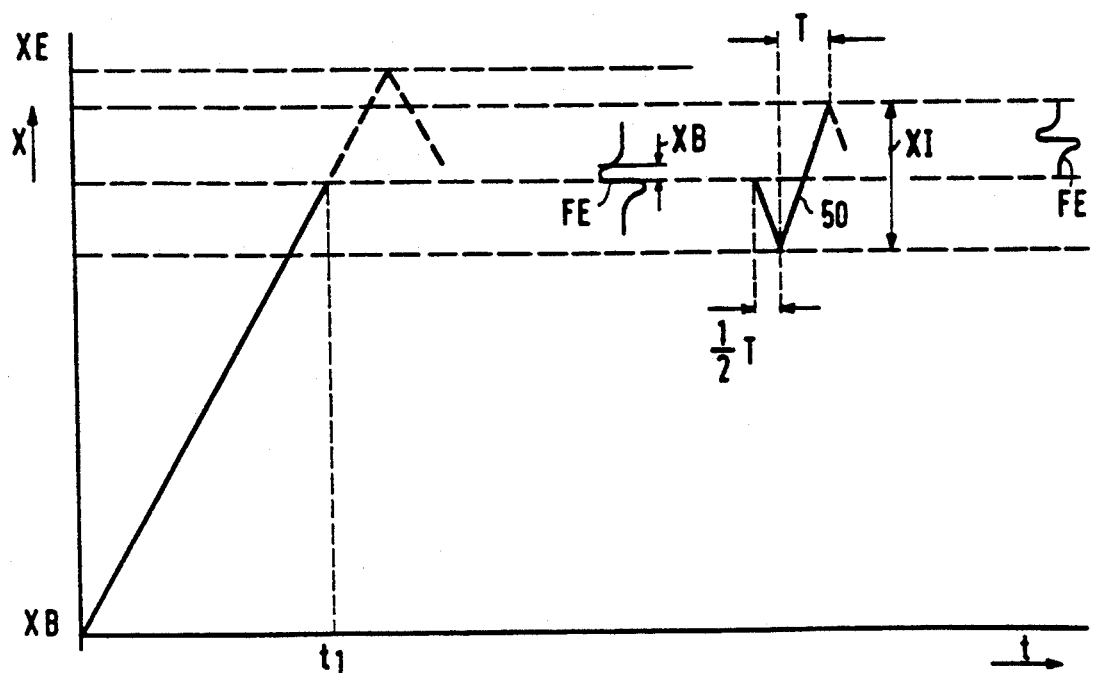
FIG. 11 shows a control signal for a focus actuator generated during capturing of the focus control.

In the embodiment shown in FIG. 2, there is a great risk that the focal point is no longer within the desired range after the radiation source has been switched on again, so a capturing procedure must be repeated. The drawback of such a capturing procedure is that it is comparatively time-consuming. In fact, when such a capturing operation is performed, the focal point is reciprocated between two extreme values, and simultaneously it is detected whether the focal point has reached the measuring range XM. FIG. 11 shows the variation of the position of the focal point as a function of time t for the purpose of illustration. The two extreme values are indicated by XB and XE. The capturing procedure generally starts with the extreme value, XB in FIG. 11, which is located furthest away from the disc 1. The instant t1 indicates the instant when it is detected that range XM is reached. At this instant, the focus control is switched on.

Embodiments of devices according to the invention in which the time required for focus control capture is considerably reduced or in which a repeated capturing procedure is no longer necessary will be described hereinafter with reference to FIGS. 5 to 9.

Figure 5:
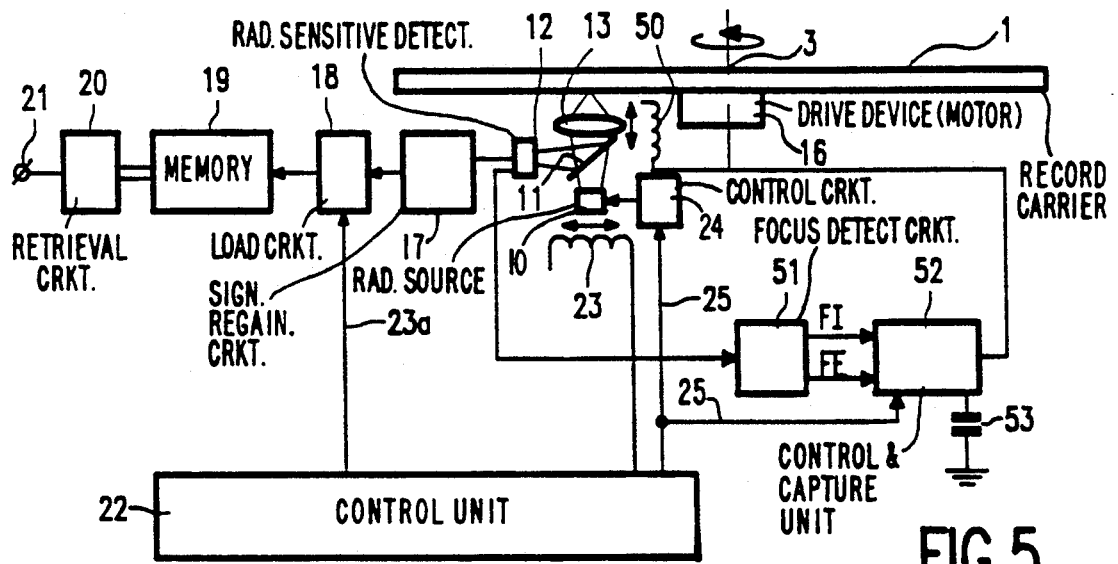

FIG. 5 shows an embodiment of a reading device according to the invention. The components of the reading device corresponding to those of the reading device shown in FIG. 2 have the same reference numerals in FIG. 5.

The reading device shown in FIG. 5 comprises a feedback focus control comprising a focusing objective 13, a focus actuator 50, a focus detection circuit 51 and a control and capturing unit 52. The focus detection circuit 51 is of a conventional type which derives the focus error signal FE from detection signals supplied by detector 12. Moreover, the focus detection circuit 51 comprises a capturing detection circuit of a conventional type which supplies a capturing detection signal FI when the focal point has come within the measuring range XM. (see FIG. 11) The focus error signal FE and the capturing detection signal FI are applied to the control and capturing unit 52. The control and capturing unit 52 comprises a capturing circuit for supplying a triangular control signal for reciprocating the focal point during the capturing operation. Moreover, the control and capturing unit 52 comprises a control circuit for deriving a focus control signal on the basis of the focus error signal FE in order to minimize the focus error signal. The control and capturing unit 52 further comprises a memory element, for example, in the form of a capacitor 53 for retaining a control signal for the focus actuator during the time intervals when the radiation source is switched off. This retained control signal substantially corresponds to the average value of the control signal in a time interval directly before the radiation source 10 is switched off. During the time intervals when the radiation source is switched off, the control circuit applies the retained control signal to the focus actuator 50. The control and capturing unit 52 still further comprises a circuit for controlling the retention of the control signal in dependence upon a control signal originating from the control unit 22. In FIG. 5, this is the control signal supplied via signal line 25.

Retaining of the control signal during the time intervals when the radiation source 10 is switched off results in the focal point already being in the proximity of the information layer after the radiation source is switched on again. Consequently, it is very likely that the focal point is still located within the measuring range XM, so a repeated capturing procedure is not necessary. A capturing procedure will be necessary in relatively sporadic cases only. This capturing procedure may be identical to the procedure used when starting the reading device. However, it is preferred to perform an adapted capturing procedure in which the focal point is reciprocated within a small range around a position which corresponds to the retained control signal for the focus actuator 50. In fact, since the focal point is still located in the proximity of the measuring range XM, it need only be reciprocated within a small range so as to be brought within the measuring range XM. In FIG. 11, this small range is denoted by XI. The range XI is much smaller than the range fixed by the extreme values XB and XE within which the focal point is reciprocated upon capture during start-up of the reading device. This means that the time required for the adapted capturing procedure is shorter than the time required for capturing during start-up of the reading device.

Figure 6:
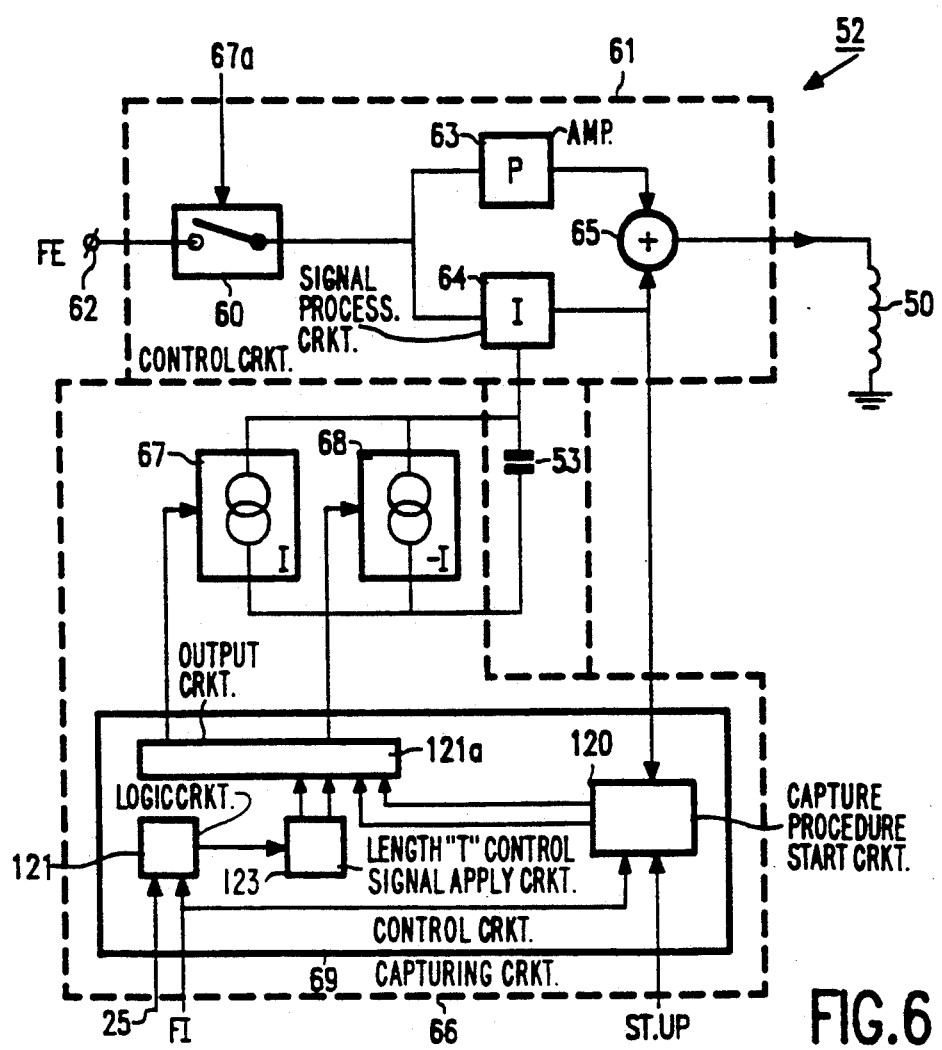
FIG. 6 shows an embodiment of a capturing and control circuit for use in a reading device according to the invention.

FIG. 6 shows by way of example one of the many possible embodiments of the control and capturing unit 52. The focus error signal FE is applied to an input 62 of a control circuit 61. The focus error signal at the input 62 is applied via an electronically controllable switch 60 to an amplifier circuit 63 having a gain factor which is substantially frequency-independent, and a signal processing circuit 64 having an integrating character. The circuit 64 determines the time integral of the focus error signal FE in a conventional manner as described in the above-mentioned patent application EP-A-0.372.650. In this circuit, use is made of the capacitor 53 in such a way that the voltage across the capacitor 53 is always indicative of the integrated value of the focus error signal FE. A signal which is proportional to this voltage is supplied as an output signal by the circuit 64. An adder circuit 65 composes the control signal for the focus actuator 50 from the output signals of the circuits 63 and 64. The switch 60 is controlled, via a single line 67a, so as to be in its open state during the period when the radiation source 10 is switched off. This means that the input signals applied to the circuits 63 and 64 become equal to zero. This in turn means that the output signal of the circuit 64 is retained at the instantaneous value it is at the instant when the switch 60 is opened. This value corresponds to the average value of the control signal during the time interval before the switch 60 is opened.

Figure 7:
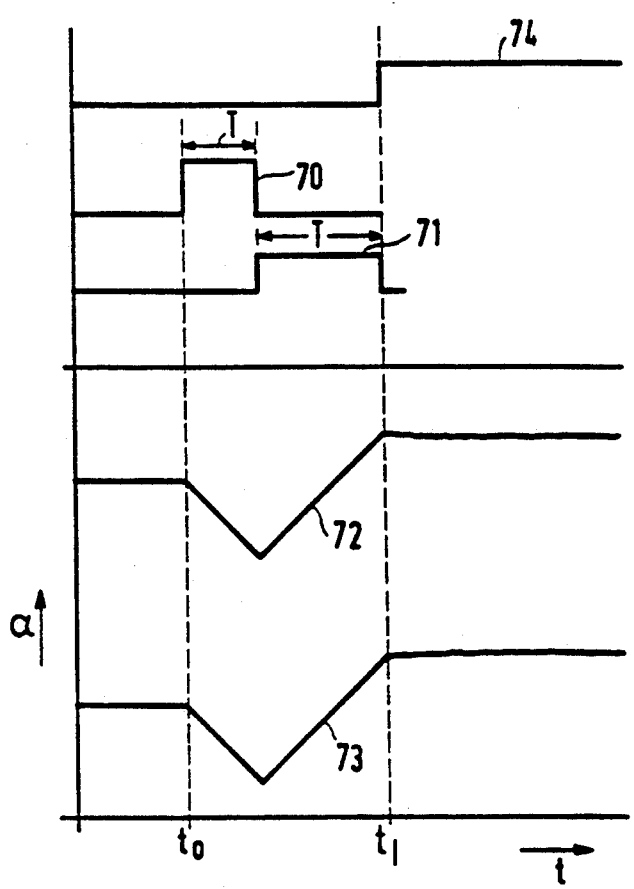
FIG. 7 shows a number of signals generated during capturing of the focus control.

The control and capturing unit 52 further comprises a capturing circuit 66. Capturing circuit 66 comprises two controllable current sources 67 and 68 which are connected to the capacitor 53 for supplying it with a current I and a current-I, respectively. The capturing circuit 66 further comprises a control circuit 69 for switching on and switching off the current sources 67 and 68 in such a way that the variation across the capacitor is triangular in order to obtain a reciprocating movement of the focal point for the purpose of capturing. To this end, the control circuit 69 comprises a circuit 120 which starts the aforementioned capturing procedure in response to a control signal ST.UP, which signal is generated when the reading device is started. The required control signals for the current sources 67 and 68 are applied to the current sources by the circuit 120 via an output circuit 121a. The capturing procedure is ended as soon as the capturing detection signal FI indicates that the focal point has reached the measuring range XM. For a detailed description of the capturing circuit reference is made to the previously-mentioned Patent Application EP-A-0.372.650. The signal line 25 is also connected to the control circuit 69. Based on the control signal on signal line 25 and the capturing detection signal FI, a logic circuit 121 of a conventional type detects whether the focal point is outside the measuring range XM after the radiation source 10 has been switched on again, and whether a short capturing procedure is to be performed. For performing this short capturing procedure, the control circuit 69 comprises a circuit 123 which successively applies a control signal of the length $\frac{1}{2}T$ to the current source 67 and a control signal of the length T to the current source 68 via the output circuit 121a. In FIG. 7, the length T and $\frac{1}{2}T$ control signals during the short capturing procedure applied to the current sources 67 and 68 are denoted as a function of time by the reference numerals 70 and 71. The voltage variation across the capacitor 53 is denoted in FIG. 7 by the reference numeral 72. The associated displacement of the focal point is denoted in FIG. 7 by reference numeral 73. The focus capturing signal FI is denoted in FIG. 7 by the reference numeral 74.

In FIG. 7, the instant to indicates when the signal on signal line 25 indicates that the voltage source is to be switched on again. In response to signal, the control circuit 69 switches on the current source 67. Consequently, the focal point is displaced. After a time interval having a length of $\frac{1}{2}T$, if the focal point has not yet reached the measuring range XM and the current source 67 is switched off and the current source 68 is switched on. Consequently, the voltage across the capacitor 53 will increase again so that the focal point will be moved in the opposite direction. At the instant t1, the capturing detection signal FI indicates that the focal point has reached the measuring range XM and the current source 68 is switched off at an early instant, while the feedback focus control is rendered operative by closing the switch 60.

In the previously described embodiment of the reading device, a control signal corresponding to the average value of the control signal during a time interval directly before the radiation source is switched off is applied to the actuator 50 during the time intervals in which the radiation source 10 is switched off. Consequently, there is a great probability that the focal point is still within the measuring range when the radiation source is switched on again. In the incidental cases where the focal point is no longer within the measuring range when the radiation source is switched on again, a preferably short capturing procedure is performed.

Another method of controlling, in which repeated capturing upon switching on the radiation source again will not be necessary, will be described hereinafter. In this method, the radiation source is switched on each time for a short period between the intervals in which the radiation source is continuously switched on for reading information, and samples of the associated focus error are taken. By means of one of these focus error signal samples taken between the intervals, the actuator can be controlled in such a way that the focal point is maintained in the measuring range XM. Since it is sufficient for the focal point to remain within the measuring range XM, the sampled control circuit obtained may have a small bandwidth in comparison with the bandwidth of the focus control during the period when the information is being read from the track. In fact, when the information is being read, it is desirable for the focal point to track the information layer very accurately, which implies a large bandwidth for the focus control system.

Figure 8:
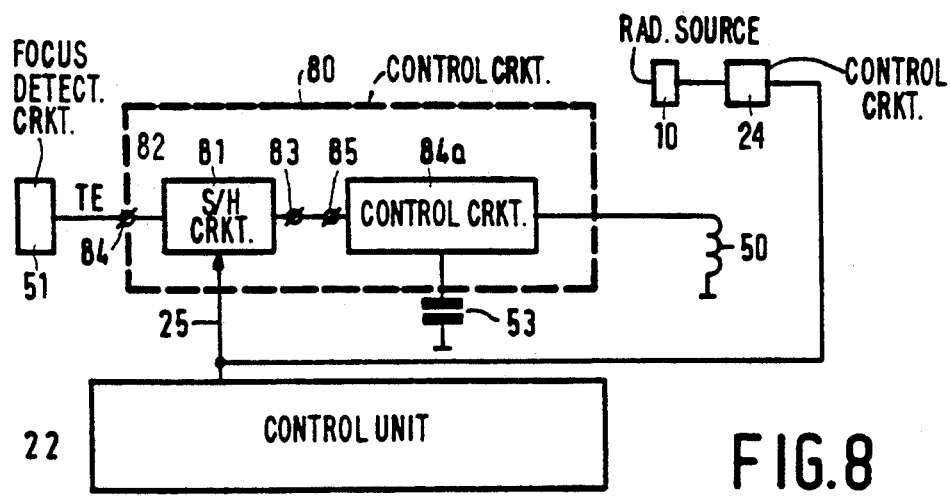
FIG. 8 shows adaptations of a further embodiment of a reading device according to the invention.

FIG. 8 shows a modification of the reading device of FIG. 5 with which the control described hereinbefore is obtained. This modification only relates to the control circuit and the control unit 22. The modified control circuit is denoted by the reference numeral 80. The control circuit 80 comprises a sample-and-hold circuit 81 of a conventional type. The sample-and-hold circuit can be brought to a sample state or hold state by means of a control signal on a signal line 82. In the sample state, an output signal at an output 83 of the sample-and-hold circuit tracks the focus error signal FE applied to an input 84. In the hold state, the focus error signal FE is retained at the same value as at the instant when the sample-and-hold circuit was brought to the hold state. The retained signal is supplied from the output 83. For supplying the output signal to a control circuit 84a, the output 83 is coupled to an input 85 of the control circuit 84a. The control circuit 84a is of a conventional type which derives a control signal for the focus actuator 50 in accordance with a suitable control criterion. The sample-and-hold circuit 81 is controlled by the control unit 22 via the signal line 25. The control unit 22 supplies a binary control signal 90 via the signal line 25. The signal 90 is shown in FIG. 9.

Figure 9:
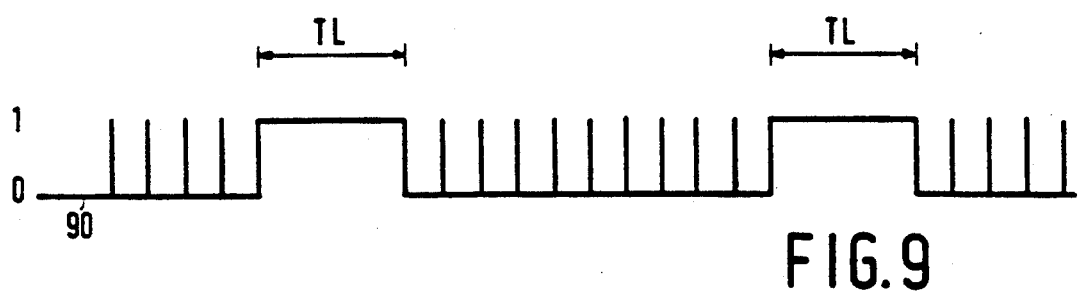
FIG. 9 shows a control signal as generated in the embodiment of FIG. 8.

The signal portions of the binary control signal 90 with a logic "1" level in FIG. 9 indicate the instants when the radiation source is switched on by the control signal, and when the sample-and-hold circuit is brought to the sample state. The time intervals TL in FIG. 9 indicate the time intervals in which the radiation source is continuously switched on for reading information from the track 2. The way in which these intervals are determined has been described hereinbefore with reference to FIG. 3. During the time intervals TL, the sample-and-hold circuit 81 is continuously retained in the hold state, which means that the focus error signal is continuously applied to the control circuit 84a. During the time intervals TL, as well as between the intervals TL, the control signal 90 periodically assumes the logic level "1" for a short time. Consequently, the radiation source is switched on for a short time and simultaneously the sample-and-hold circuit 81 takes a sample of the focus error signal. Based on these samples, the control circuit 84 always brings the focal point towards the information layer. As a result of the relatively low-frequency samples of the focus error signal, the sampled focus control will have a smaller bandwidth than that of the focus control in the time intervals TL. As already noted hereinbefore, this is no problem because the accuracy with which the focal point causes held on the information layer between the time intervals TL is not important, provided that the sampled focus control retains the focal point within the measuring range.

Figure 10:
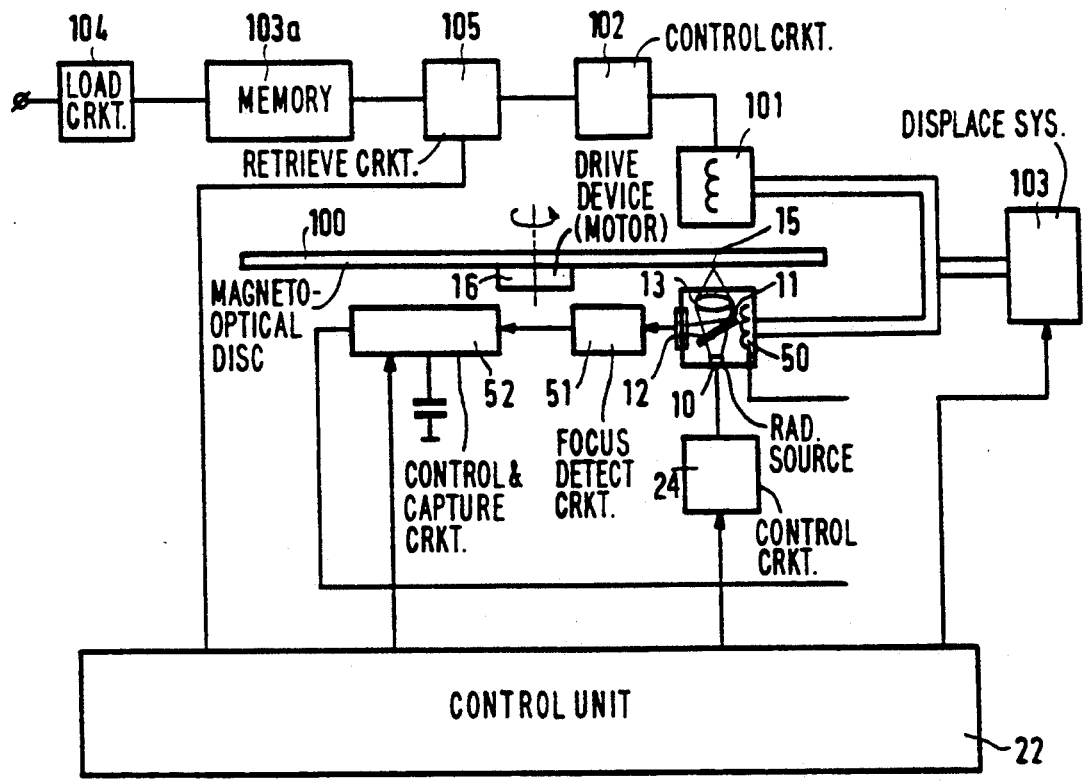
FIG. 10 shows an embodiment of the recording device according to the invention.

The invention has been described hereinbefore with reference to a reading device. Similar measures as described for the reading device are also applicable for reducing the power consumption in a recording device in which the recording operation is interrupted with time intervals. Recording devices of such a type are described in detail in the aforementioned Patent Applications EP-A-0.429.139, WO 91/11002 and WO 91/11003. FIG. 10 shows a recording device modified in accordance with the invention.

In FIG. 10 the components corresponding to those in FIG. 5 have the same reference numerals. The device shown is a magneto-optical recording device in which a pattern corresponding to the recording information is obtained by bringing the part scanned and heated by a radiation beam under the influence of a magnetic field modulated in accordance with the information to be recorded.

In FIG. 10, a magneto-optical disc 100 is scanned by means of the radiation beam by displacing the disc 100 with the aid of the motor 16 along the optical system comprising a partially transparent mirror 14 and an objective 13. To generate the magnetic field, the recording device has a coil 101. The optical system and the coil 101 are components of a magneto-optical write head which can be moved radially with respect to the disc 100 by means of a known displacement system 103 under the control of the control unit 22. The information to be recorded in the form of a continuous bit stream is loaded at a given load rate into an input buffer memory 103a by means of a load circuit 104. The information loaded into the input memory buffer memory 103a is retrieved therefrom by means of a retrieval circuit 105 at a retrieval rate which is higher than the load rate. The retrieval circuit 105 applies the retrieved information to a control circuit 102 which converts the retrieved information into a write signal for the coil 101 in order for it to provide a pattern of magnetic domains corresponding to the retrieved information in a magneto-optical information layer of the disc 100. While the information is being recorded, the radiation source 10 is set to a write intensity which is sufficiently high to magnetize the magneto-optical information layer of the disc 100 in the desired direction at a location of the scanning spot 15 by means of the magnetic field generated by the coil.

Due to the fact that the load rate is lower than the retrieval rate, the filling level of the input buffer memory 103a will decrease when the information is being recorded. As soon as the filling level comes below a given value, the retrieval of information from the input buffer memory 103a is interrupted and the radiation source is switched off by the control unit 22. As soon as the contents of the input buffer memory 103a have sufficiently increased in order to restart the recording operation, the radiation source 10 is first switched on at a read intensity at which the disc is not sufficiently heated to realize a change of magnetization in the heated portion but which is sufficient to enable a focus control, and to search the position on the disc 100 where the recording was interrupted. As soon as this position has been found, the intensity of the radiation source 10 is increased to the write intensity, and the retrieval of the information from the input buffer memory is resumed. To ensure that little time is lost upon recapturing of the focusing when the recording operation is resumed, similar measures as those described with reference to the reading device can be used.

If the focal point is retained in the proximity of the information layer by means of a sampled focus control during the time intervals in which no information is being recorded, the radiation source 10 should be set to the read intensity when samples of the focus error signal are taken. This should be done to prevent information from being overwritten when the samples are being taken.

The recording device described hereinbefore in FIG. 10 is of a type in which the information is recorded by means of a modulated magnetic field. However, it is to be noted that the invention is also applicable to optical recording devices in which the information is recorded by means of a modulated radiation beam.

I claim:

1. An optical reading device for reading information recorded in a track of an optical disc carrier, the device comprising:

a radiation source for generating a radiation beam;

an optical system for directing the radiation beam via the track onto a radiation-sensitive detector, the radiation beam producing a scanning spot on the disc carrier;

a driving device for displacing the scanning spot with respect to the disc carrier in a longitudinal direction of the track at a given scanning rate;

a signal regaining circuit for regaining the information recorded on the track on the basis of a detection signal supplied by the radiation-sensitive detector;

a load circuit for loading the information regained by the regaining circuit in an output buffer memory at a given load rate;

a signal retrieval circuit for retrieving the information loaded in the buffer memory at a given retrieval rate which is lower than the load rate;

control means for interrupting loading of the information regained by the regaining circuit in the buffer memory, for displacing the scanning spot after a given time interval to a track portion where loading was interrupted and for subsequently resuming loading of the information regained by the regaining circuit at an instant when the scanning spot reaches the track position where loading of the buffer memory was interrupted, such that a filling level of the buffer memory remains between given limits; and means for switching off at least the radiation source in time intervals in which loading of the buffer memory is interrupted.

2. The device as claimed in claim 1, further comprising focusing means for focusing the radiation beam; a focus control for maintaining a focal point of the radiation beam in the plane of the track, the focus control comprising a focus actuator for displacing the focal point in a direction perpendicular to the disc carrier, and a control circuit for applying a control signal dependent on a focus error signal to the focus actuator; and means for maintaining the control signal, during the time intervals when the radiation source is switched off, at a value which is substantially equal to the average value of the control signal in a time interval directly before the radiation source is switched off.

3. The device as claimed in claim 2, wherein the focus control further comprises means for deriving the focus error signal such that it is indicative of the focus error within a given measuring range of the focal point position; and the device further comprises focus capturing means for bringing the focal point within the measuring range, the focus capturing means comprising means for reciprocating the focal point between two extreme values, a focus capturing detector for supplying a capturing detection signal indicating that the focal point is within the measuring range and switching means for switching on the focus control in response to the capturing detection signal, the focus capturing means comprising means for reciprocating the focal point within a range of displacement surrounding a position which corresponds to the focus control signal, the range of displacement being smaller than the range fixed by the two extreme values.

4. The device as claimed in claim 1, further comprising focusing means for focusing the radiation beam; and a focus control for maintaining a focal point of the radiation beam in the plane of the track, the focus control comprising a focus actuator for displacing the focal point in a direction perpendicular to the disc carrier, a control circuit for applying a control signal dependent on a focus error signal to the focus actuator, means for taking samples of the focus error signal during time intervals when the loading of the buffer memory is interrupted, and switching means for temporarily switching on the radiation source while the samples are being taken.

5. The device as claimed in claim 4, wherein the focus control has a first bandwidth when the buffer memory is being loaded, and a second bandwidth, which is smaller than the first bandwidth, in the time intervals in which loading of the buffer memory is interrupted.

6. An optical recording device for recording information in a track of an optical record carrier, the device comprising:

write means for providing an information pattern in the track in response to a write signal, for which purpose the write means comprises a radiation source for generating a radiation beam, and an optical system for directing the radiation beam via the track onto a radiation-sensitive detector, the radiation beam producing a scanning spot on the record carrier;

a driving device for displacing the scanning spot with respect to the record carrier in a longitudinal direction of the track at a given scanning rate;

an input buffer memory for storing the information to be recorded at a given load rate;

a retrieval circuit for retrieving the information from the buffer memory at a retrieval rate which is higher than the load rate;

a control circuit for converting the information retrieved by the retrieval circuit into the write signal;

control means for interrupting retrieval of the information from the buffer memory, for displacing the scanning spot after a given time interval to a track portion where retrieval was interrupted and for subsequently resuming retrieval of the information, such that a filling level of the buffer memory remains between given limits; and means for switching off the radiation source in time intervals in which retrieval of the information is interrupted.

7. The device as claimed in claim 6, further comprising focusing means for focusing the radiation beam; a focus control for maintaining a focal point of the radiation beam in the plane of the track, the focus control comprising a focus actuator for displaying the focal point in a direction perpendicular to the record carrier, and a control circuit for applying a control signal dependent on a focus error signal to the focus actuator; and mean for retaining the control signal during the time intervals when the radiation source is switched off.

8. The device as claimed in claim 7, wherein the focus control further comprises means for deriving the focus error signal such that it is indicative of the focus error within a given measuring range of the focal point position; and the device further comprises focus capturing means for bringing the focal point within the measuring range, the focus capturing means comprising means for reciprocating the focal point between two extreme values, a focus capturing detector for supplying a capturing detection signal indicating that the focal point is within the measuring range and switching means for switching on the focus control in response to the capturing detection signal, the focus capturing means comprising means for reciprocating the focal point within a range of displacement surrounding a position which corresponds to the focus control signal, the range of displacement being smaller than the range fixed by the two extreme values.

9. The device as claimed in claim 6, further comprising focusing means for focusing the radiation beam; and a focus control for maintaining a focal point of the radiation beam in the plane of the track, the focus control comprising a focus actuator for displacing the focal point in a direction perpendicular to the record carrier, a control circuit for applying a control signal dependent on a focus error signal to the focus actuator, means for taking samples of the focus error signal during time intervals when the loading of the buffer memory is interrupted, and switching means for temporarily switching on the radiation source while the samples are being taken.

10. The device as claimed in claim 9, wherein the focus control has a first bandwidth when the buffer memory is being loaded, and a second bandwidth, which is smaller than the first bandwidth, in the time intervals in which loading of the buffer memory is interrupted.

* * * * *